Patented Nov. 16, 1926.

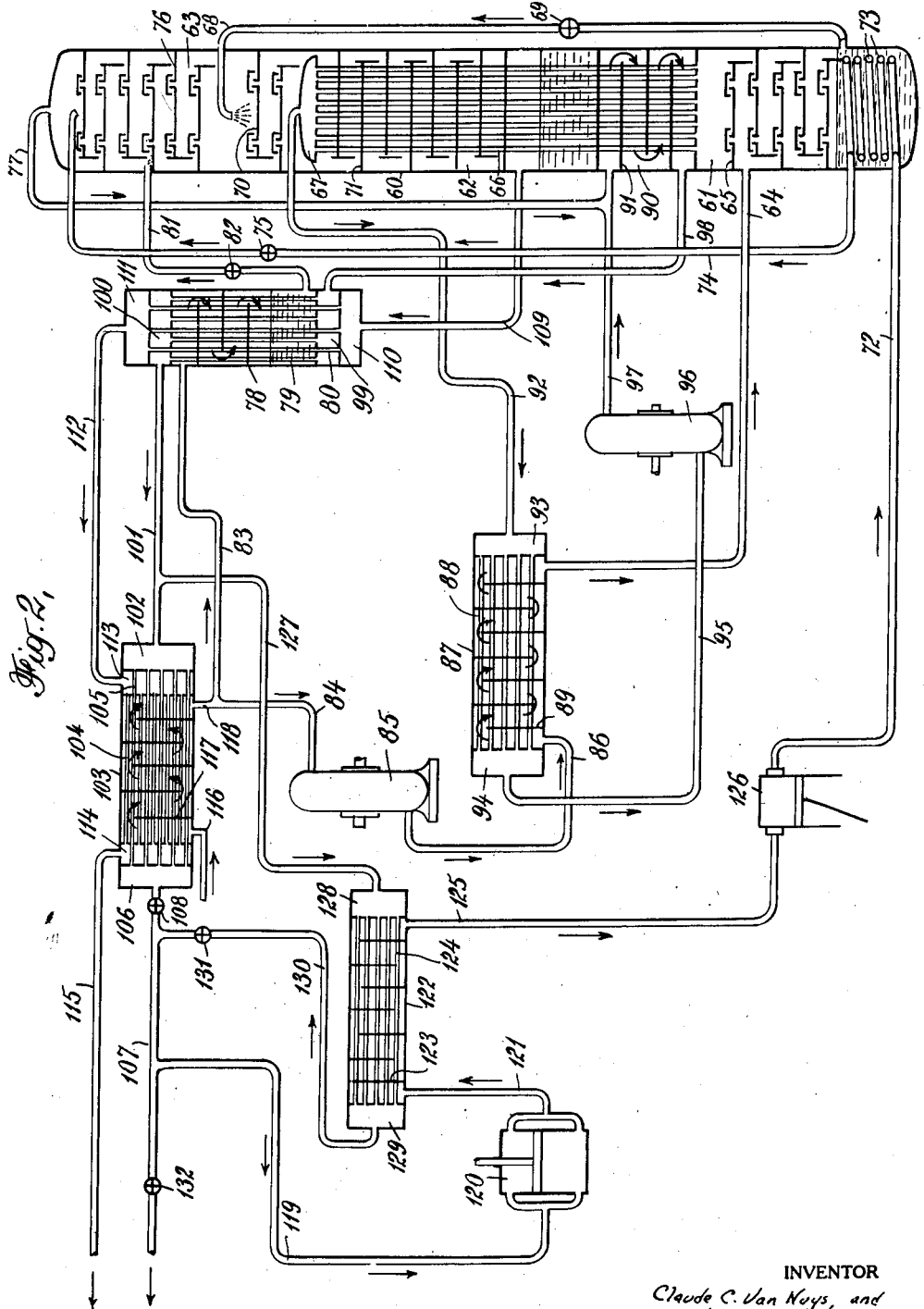

1,607,322

UNITED STATES PATENT OFFICE.

CLAUDE C. VAN NUYS, OF CRANFORD, AND JOSEPH L. SCHLITT, OF ELIZABETH, NEW JERSEY, ASSIGNORS TO AIR REDUCTION COMPANY, INCORPORATED, OF NEW YORK, N. Y., A CORPORATION OF NEW YORK.

LIQUEFACTION OF GASES.

Application filed January 10, 1925. Serial No. 1,568.

This invention relates to the separation of the constituents of gaseous mixtures by liquefaction. It is applicable to the treatment of air to produce oxygen-enriched mixtures and it can be utilized also for the more complete separation of the constituents of air and of other gaseous mixtures. Its application is more especially in systems where the necessary refrigeration is produced by the expansion of all or a portion of the gaseous mixture in suitable engines or turbines, and particularly, although not exclusively, where the operations are carried on in apparatus of large capacity.

It is the object of the invention to increase the efficiency obtainable in the liquefaction of the gaseous mixture to be separated, to permit control thereof in a more satisfactory manner, to secure the desired results with a minimum consumption of energy, and especially to enable the expansion machines to operate under conditions of maximum efficiency.

In all liquefaction systems the liquefaction of that portion of the working fluid which must be liquefied is accomplished so far as is possible by causing it to evaporate bodies of liquid which have accumulated previously and which have already undergone more or less complete separation. Under ideal conditions, i. e., if the system were thermodynamically reversible and perfectly insulated from external heat, all of the necessary liquid could be produced in this manner. Actually such systems involve various irreversibilities and the insulation is never perfect. It is necessary, therefore, to provide for the production of surplus liquid to compensate for that portion thereof which is evaporated in the system without the formation of corresponding liquid to replace it.

The production of surplus liquid is accomplished by causing the cold outgoing vapor products to pass in heat-exchanging relation with the compressed incoming fluid, a portion of that fluid being thereby liquefied. The quantity of surplus liquid thus produced should be just that necessary to compensate for the losses above noted. The heat exchange as described produces, of course, no additional refrigeration. It merely assures the presence of sufficient liquid in the system. The refrigeration is produced by expansion of the entering gaseous mixture or of the separated products, and it is necessary to compress the gaseous mixture initially to a point which is high enough to permit the production of the required refrigeration upon expansion of the mixture or the products.

In a well known liquefaction method which is widely used for industrial purposes the gaseous mixture to be separated is first compressed. After the heat of compression is removed so far as is possible by circulation of the compressed mixture through water coolers, the gaseous mixture enters an exchanger system wherein it comes into thermal contact with the cold separated outgoing products and its temperature is thereby lowered. The cold gaseous mixture is then divided into two portions, the larger of which is expanded in a reciprocating expansion engine or in a turbine from which it passes directly into the column in which the separation of the constituents is accomplished. The gaseous mixture is there liquefied selectively by passing upwardly through a plurality of tubes which are surrounded by previously accumulated bodies of liquid. The liquefied portion is next conducted to an intermediate level of a rectification column after the pressure on the liquid has been reduced by passage through a throttle valve. In the rectification column the liquid flows downwardly over a plurality of trays in direct contact with vapors ascending from the bodies of liquid which surround the previously mentioned tubes. The downwardly flowing liquid is enriched in the more readily condensable constituent, whereas the less readily condensable constituent joins the vapors rising through the column and ultimately escapes therefrom. The uncondensed residue from the tubes in which selective liquefaction occurs, is condensed usually in a so-called "reflux condenser" located at an intermediate level of the rectifier, and after reduction of pressure by passing through a throttle valve the resulting liquid is delivered to the top of the rectifier and flows downwardly therein as a reflux to ensure the more complete separation of the constituents of the gaseous mixture.

That portion of the original mixture which does not enter the expansion engine is conducted to a liquefier where it passes in thermal contact with the cold outgoing separated gases leaving the rectifier. This portion of the mixture, being still at its initial pressure, is liquefied and is delivered to the column to compensate for the liquid losses above referred to. Usually the liquid is added to that obtained from the tubes in which selective liquefaction occurs.

In the actual operation of this method liquefaction in the expansion engine must be avoided because of the mechanical defficulties which would result otherwise. Consequently the method is so operated that the gaseous mixture leaving the engine is at a temperature substantially higher than that at which condensation will occur at the pressure of the gas as it leaves the engine. The heat which must be extracted from the engine exhaust before it will liquefy may be termed "superheat", and in the operation as usually conducted the "superheat" is removed in the tubes at the bottom of the column before any condensation or selective liquefaction occurs. This cooling of the gaseous mixture is at the expense of the surrounding bodies of liquid and a considerable portion thereof is vaporized without the production of any corresponding quantity of liquid in the tubes. To the extent that liquid is evaporated without the formation of an equivalent amount of liquid in the tubes, compensating liquid must be produced in the liquefier.

We have discovered that the "superheat" can be removed from the engine exhaust so that the temperature thereof is reduced substantially to that of condensation at the prevailing pressure by thermal contact between a cold product of the separation and the engine exhaust before the latter enters the column or before the engine exhaust passes into thermal contact with the bodies of liquid which accumulate in the column. The residual gas, for example, escapes from the upper ends of the tubes, in which selective liquefaction occurs, at a temperature which is substantially the same as that of the bodies of evaporating liquids in the column. Consequently this residual gas is colder than the engine exhaust and there is a sufficient quantity available to reduce the temperature of the engine exhaust substantially to that of condensation. Cold gaseous products from the column can be utilized also to remove a portion of the heat of condensation from the gaseous mixture. This can be accomplished by subjecting the gaseous mixture, after removal of the superheat, to thermal contact with the cold gaseous products. Liquefaction is completed by thermal contact of the gaseous mixture with the accumulated bodies of liquid.

The advantages of operation in accordance with the present invention are that a larger proportion or all of the entering gaseous mixture can be sent directly to the expansion engine with a corresponding increase in the amount of refrigeration which is available. The total amount of required refrigeration is fixed more or less by the leakage of heat into the system and with the more efficient production of refrigeration it is possible to reduce the initial pressure of the entering gaseous mixture. Reduction in pressure involves a material saving in the power required to operate the system. There is a further saving because a larger portion if not all of the entering gaseous mixture is subjected to the initial separation by selective liquefaction and the work necessarily done in the rectifier is reduced to a corresponding extent. A larger volume of residual gas at the initial pressure is made available for expansion and use as a refrigerating agent. This in turn has a beneficial effect upon the total amount of power required to operate the system.

The invention may be applied in various ways to relatively simple and more complex liquefaction systems involving the partial or substantially complete separation of the constituents of gaseous mixtures and the utilization of various cold products of the separation to cool the gaseous mixture after expansion thereof and before it comes into thermal contact with the liquids accumulated in the column. The cooling of the expanded gaseous mixture may be accomplished in a separate exchanger or in a heat-exchanging compartment of the column through which the gaseous mixture passes before it enters the section where the liquids are maintained. Two of the preferred arrangements are illustrated in the accompanying drawings, but it is to be understood that the drawings are illustrative and that, moreover, the details of a liquefaction system which are well known to those skilled in the art are omitted in order that the drawing may more clearly illustrate the principles of the invention. In the drawing—

Fig. 2 is a similar illustration of another apparatus in which a cold gaseous product is utilized to remove heat of condensation from the gaseous mixture.

Figure 1:
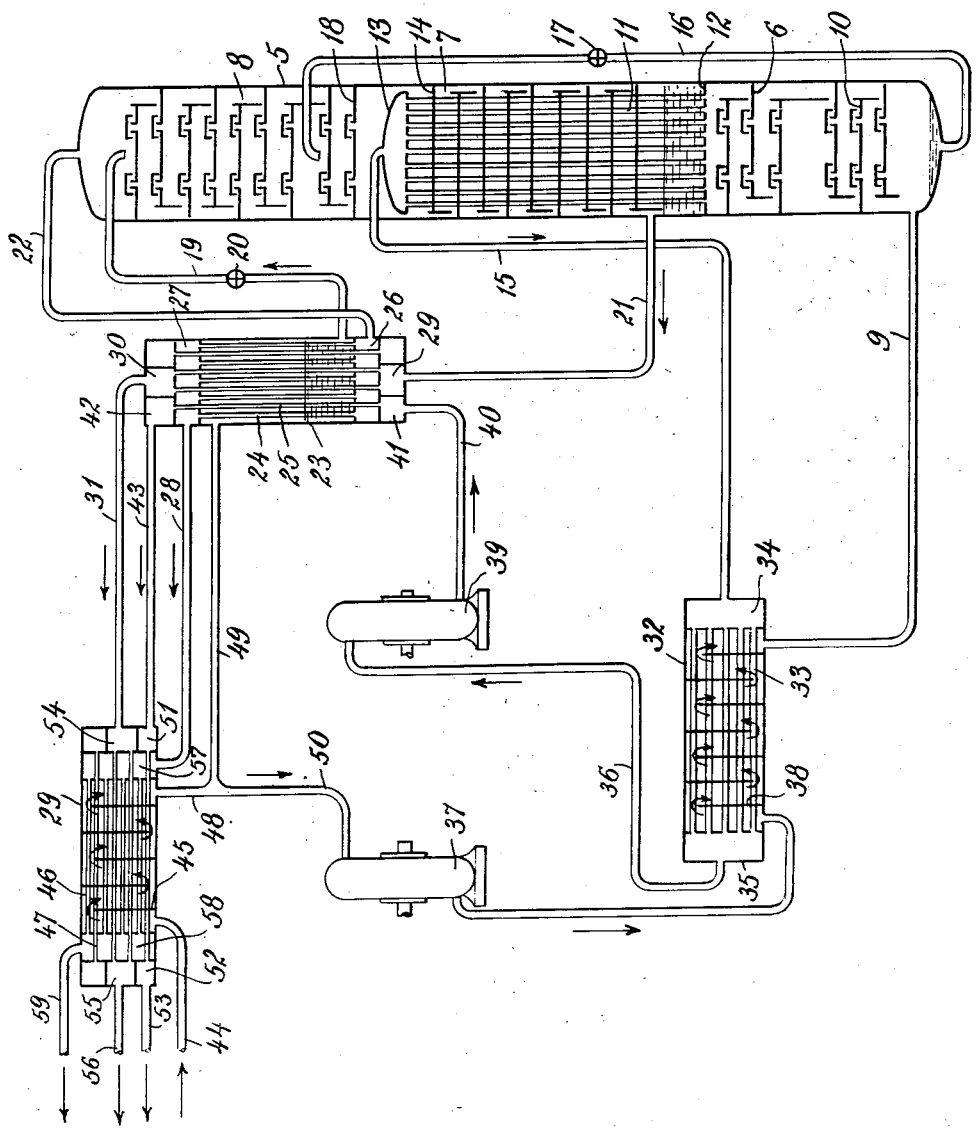
Fig. 1 is a diagrammatic illustration of an apparatus adapted to be used in carrying out the invention.

In describing the apparatus it may be assumed that the gaseous mixture treated is air consisting of oxygen and nitrogen. The presence of argon and rare elements in the air will be disregarded because the invention can be described adequately by reference merely to the two principal constituents of the atmosphere.

Referring to Fig. 1 of the drawing, 5 indicates a column consisting of compartments 6, 7 and 8. The air, after expansion from the initial pressure and cooling in the manner heretofore described, enters the compartment 6 through a pipe 9 and passes upwardly through a plurality of trays 10 such as are used commonly in rectifiers in direct contact with the liquid produced in a plurality of tubes 11 as the result of selective liquefaction. The passage of the entering air through the trays 10 provides a preliminary rectification of the liquid with resulting enrichment thereof in the more readily condensable constituent, i. e., oxygen. The air, after passing the trays and accumulating an additional proportion of nitrogen as the result of the preliminary rectification, enters the tubes 11 which extend upwardly from a partition 12 to a header 13. The tubes are surrounded by liquid which flows downwardly over a plurality of trays 14 in the compartment 7, and this liquid which is the result of rectification in the rectifier at the top of the column is vaporized by thermal contact with the gaseous mixture in the tubes. The result is selective liquefaction of the gaseous mixture, the liquid flowing back through the tubes onto the trays 10 while the residual unliquefied gas consisting of substantially pure nitrogen escapes to the head 13 and is withdrawn through a pipe 15.

The liquid accumulating in the bottom of the compartment 6 which, in the particular case mentioned, consists of a mixture of nitrogen and oxygen containing approximately 47% of oxygen, is delivered through a pipe 16 controlled by a pressure-reducing valve 17 to a compartment 8 or rectifier of the column. It flows downwardly over trays 18 and 14 and is progressively enriched in oxygen, a portion of the liquid being vaporized by heat exchange with the gaseous mixture in the tubes 11 to provide the vapor for rectification.

An additional amount of liquid, in this case liquid air, is introduced to the compartment 8 through a pipe 19 controlled by a valve 20. This liquid, containing a larger proportion of nitrogen than the liquid delivered through the pipe 16, flows downwardly over the trays 18 in the upper part of the compartment and is rectified by contact with the rising vapors. The liquid finally joins that introduced through the pipe 16, and the mixed liquids with further rectification accumulate eventually in the bottom of the compartment 7 where a portion of the liquid is vaporized and withdrawn through a pipe 21. The effluent from the rectifier 8 consists principally of nitrogen and escapes through a pipe 22 at the top of the column.

The liquid delivered through the pipe 19 is supplied by a liquefier 23 consisting of a shell enclosing a plurality of tubes 24 and 25. The liquefier is cooled by cold products of the separation. The effluent from the rectification is delivered by the pipe 22 to a compartment 26 at one end of the liquefier 70 and passes through the tubes 24 to a compartment 27 at the opposite end. Thence it passes through a pipe 28 to an exchanger 29. Similarly the vapor from the bottom of the compartment 7 is delivered through the pipe 21 to a compartment 29 at one end of the liquefier 23 and passes through the tubes 25 to a corresponding compartment 30 at the opposite end of the liquefier. Thence it escapes through a pipe 31 to the exchanger 29.

The residual gas from the tubes 11 might also be delivered directly to the liquefier but it is the purpose of the present invention to reduce the size of the liquefier to a minimum and to thus limit the amount of liquid which must be produced therein. The cold residual nitrogen is delivered, therefore, by the pipe 15 to an exchanger 32 consisting of a shell and a plurality of tubes 33 terminating in chambers 34 and 35. The residual nitrogen enters the chamber 34 and passes through the tubes 33 to a chamber 35 from which it escapes through a pipe 36. The nitrogen is warmed by thermal contact with the exhaust from an expansion machine 37 in which the entering gaseous mixture is expanded. This expanded gaseous mixture contains a certain amount of "superheat" and is at a higher temperature than that of the residual nitrogen. It circulates about a plurality of baffles 38 and the tubes 33 in the exchanger 32 and is thus cooled to substantially the liquefaction temperature. It escapes through the pipe 9 to the compartment 6 of the column as hereinbefore described.

The residual nitrogen, after passing through the exchanger 32, is expanded preferably in a suitable expansion engine or turbine 39 so that its temperature is reduced. It is delivered then through a pipe 40 to a compartment 41 at one end of the liquefier 23 and passes through the tubes 25 to a corresponding compartment 42 at the opposite end of the liquefier. Thence it passes through a pipe 43 to the exchanger 29.

The entering gaseous mixture after compression and cooling in the usual water coolers (not shown) is delivered through a pipe 44 to the exchanger 29 and circulates about baffles 45 and tubes 46 and 47 therein where it is cooled by thermal contact with the outgoing gaseous products of the separation. The compressed gaseous mixture escapes through a pipe 48 and a portion thereof is delivered through a pipe 49 to the liquefier 23 to produce the liquid which enters the column finally through the pipe 19. The larger part of the compressed gaseous mixture is delivered through a pipe 50 to the expansion engine or turbine 37 and after expansion passes through the exchanger 32 and thence through the pipe 9 to the column.

It is the purpose of the invention to deliver as much as possible of the compressed gaseous mixture to the engine 37 and to reduce or substantially eliminate the liquid which is produced in the liquefier 23. Owing to the leakage of heat into the system complete elimination of the liquefier is impracticable probably, but by removing the "superheat" from the engine exhaust so that substantially none of this heat is transmitted to the liquid in the column the necessary size of the liquefier and the amount of gas flowing therethrough can be materially limited. In starting the operation the liquefier performs a valuable function in producing the necessary liquid rapidly and more or less efficiently, but when sufficient liquid has accumulated and the column is in normal operation the liquefier need only replace the amount of liquid which is evaporated without the production of a corresponding amount of liquid directly in the column.

The cooling of the entering gaseous mixture is accomplished in the exchanger 29 in the usual way by the passage of cold products of the separation therethrough. The effluent is delivered by the pipe 28 to a compartment 57 at one end of the exchanger and travels through tubes 46 to a compartment 58 at the opposite end of the exchanger and escapes thence through a pipe 59 to the atmosphere or to a suitable receptacle. The oxygen product is delivered by the pipe 31 to a compartment 54 at one end of the exchanger and passes through the tubes 47 to a corresponding compartment 55 from which it escapes through a pipe 56 leading to a storage receptacle (not shown). The expanded residual gas is delivered by the pipe 43 to a compartment 51 at one end of the exchanger and travels through tubes 47 to a similar compartment 52 at the opposite end of the exchanger and thence through a pipe 53 to the atmosphere or to a suitable storage receptacle.

The same principle is applied in the apparatus as illustrated in Fig. 2 of the drawing with the provision for additional cooling of the entering gaseous mixture in the column before thermal contact of the gaseous mixture with the accumulated liquid therein. Referring to the drawing, a column 60 comprises a plurality of compartments 61, 62 and 63. The gaseous mixture enters the compartment 61 through a pipe 64 and passes upwardly through trays 65 of the usual type and thence into a plurality of tubes 66 in contact with liquid formed in and descending from the tubes. The residual unliquefied gas escapes from the tubes to a header 67 while the liquid flowing backwardly through the tubes and over the trays 66 accumulates in the bottom of the compartment 61.

This liquid, which in the present case consists of oxygen and nitrogen with approximately 47% of oxygen, is delivered through a pipe 68 controlled by a pressure-reducing valve 69 to the compartment 63 or rectifier of the column. It flows downwardly over a plurality of trays 70 and 71 in the compartments 63 and 62 and, being subjected to rectification thereon by contact with the vapors rising through the column, accumulates finally in the bottom of the compartment 62 as substantially pure oxygen.

In this application of the invention a reflux liquid is provided consisting of substantially pure nitrogen which is delivered by a pipe 72 to a coil 73 in the bottom of the compartment 61. The nitrogen entering the coil is liquefied by thermal contact with the liquid in the bottom of the compartment 61 and vaporizes a portion thereof. The vapor rises through the trays 65 and accomplishes a preliminary rectification of the liquid descending thereon. The liquefied nitrogen is delivered through a pipe 74 controlled by a valve 75 to the top of the compartment 63 and flows downwardly over the trays 76 therein in contact with the vapors rising through the column with the result that an effluent consisting of substantially pure nitrogen escapes through the pipe 77 at the top of the column while substantially all of the oxygen is removed from the vapors rising in the column and ascends with the liquid over the various trays into the bottom of the compartment 62.

The additional liquid required for the operation of the column is produced in a liquefier 78 consisting of a shell and a plurality of tubes 79 and 80 through which cold gaseous products of the separation are directed. The liquid is delivered through a pipe 81 controlled by a valve 82 to an intermediate part of the rectifying compartment 63. In the present case the liquid consists of liquid air and the position at which this liquid enters the rectifier is selected to avoid any disturbance of the equilibrium conditions therein.

The entering gaseous mixture, after compression and cooling, is divided, a certain portion passing to the liquefier 78 through a pipe 83 while the balance is delivered through a pipe 84 to an expansion engine or turbine 85 where it is expanded and thereby cooled. The exhaust from this engine contains a considerable quantity of "superheat" and is at a temperature considerably higher than that required for liquefaction. In accordance with the present invention the exhaust from the engine 85 is delivered through a pipe 86 to an exchanger 87 consisting of a shell and a plurality of tubes 88. The expanded gaseous mixture passes about a plurality of baffles 89 and the tubes 88 and is delivered thence to the pipe 64 which carries it to the compartment 61. The further cooling of the gaseous mixture is accomplished in a special compartment 90 of the column through which the tubes 66 extend. This compartment is below the compartment 62 and is provided with a plurality of baffles 91 about which cold gaseous products of the separation may be circulated. Thus, the effluent from the rectification may be delivered through the pipe 77 to the compartment 90. The residual unliquefied gas from the tubes 66 is withdrawn through a pipe 92 and is delivered to a compartment 93 at one end of the exchanger 87. After passing through the tubes 88 the residual gas enters a compartment 94 and travels thence through a pipe 95 to an expansion engine or turbine 96 wherein it is expanded and thereby cooled. This cold gas is delivered through a pipe 97 to the compartment 90 of the column joining the effluent which enters the compartment 90 through the pipe 77. The gaseous nitrogen, after circulating about the baffles 91, is delivered through a pipe 98.

By this arrangement the residual unliquefied gas serves as a cooling agent for the expanded gaseous mixture both in the exchanger and in the column. The cooling is supplemented by the effluent from the top of the column. The maximum refrigerative effect is utilized, therefore, in reducing the "superheat" of the engine exhaust and in removing the heat of condensation, thus decreasing the amount of liquid which is evaporated in the column without the production of a corresponding quantity of liquid therein.

The gas from the compartment 90 travels through the pipe 98 to a compartment 99 at one end of the liquefier 78 and passes thence through the tubes 79 to a corresponding compartment 100 at the opposite end of the liquefier. A pipe 101 conveys this gas to a compartment 102 at one end of an exchanger 103 in which tubes 104 and 105 are arranged. The gas travels through the tubes 105 to a compartment 106 to the opposite end of the exchanger and escapes thence through a pipe 107 controlled by a valve 108.

The vapor produced in the bottom of the compartment 62 is in this case substantially pure oxygen and is delivered through a pipe 109 to a compartment 110 at one end of the liquefier 78. After passing through tubes 80 to a corresponding compartment 111 the gas is delivered through a pipe 112 to a compartment 113 at one end of the exchanger 103. It passes through tubes 104 to a corresponding compartment 114 and is delivered thence through a pipe 115 to a storage receptacle (not shown). The entering gaseous mixture is delivered by a pipe 116 to the exchanger 103 and passes about baffles 117 therein in contact with the tubes 104 and 105. It escapes through a pipe 118.

It is necessary to provide nitrogen for the reflux liquid which is made in the coil 73. This nitrogen may be drawn from the pipe 107 and delivered through a pipe 119 to an auxiliary compressor 120. After compression and cooling in the usual water coolers (not shown) the nitrogen is delivered through a pipe 121 to an exchanger 122 in which it circulates around baffles 123 and tubes 124. After passing through the exchanger the nitrogen is delivered through a pipe 125 to an expansion engine or turbine 126 where it is expanded and thereby cooled. From the expansion engine the nitrogen passes through the pipe 72 to the coil 73 as previously described.

The nitrogen is cooled in the exchanger 122 by thermal contact with a cold product of the separation, preferably nitrogen, which may be drawn from the pipe 101 through a by-pass 127 about the exchanger 103. A portion of the nitrogen is thus delivered to a chamber 128 at one end of the exchanger 122 and passes through the tubes 124 thereof to a chamber 129 at the opposite end of the exchanger. Thence the nitrogen passes through a pipe 130 controlled by a valve 131 to the outlet pipe 107. The latter is controlled by a valve 132 which permits the deflection of the desired portion of the nitrogen to the auxiliary compressor 120 as hereinbefore described.

While we have described the application of the invention in methods which will permit the satisfactory separation of the constituents of air, it is to be observed that all of the features of these methods are not essential to the use of the invention nor is it necessary that the cooling of the exhaust from the expansion engine be accomplished exactly as described in the present application. The principle of the invention depends upon the removal of "superheat" from the engine exhaust so that its temperature approaches more nearly or actually reaches substantially the temperature of liquefaction before it comes into thermal contact with bodies of liquid in the column. There are numerous points in the system from which cold products can be drawn for the refrigeration of the engine exhaust and the application of such refrigeration is within the spirit of the present invention. Furthermore, the method can be applied to the treatment of gases other than air with such modifications as may be necessary in view of the peculiar characteristics of the gases comprising the various mixtures treated. The invention can be applied with advantage wherever in a liquefaction system the gaseous mixture is compressed and expanded for the purpose of cooling and is thereafter subjected to thermal contact with a liquid. In all such systems the liquid must be maintained and if evaporation from the thermal contact mentioned exceeds the amount of liquid produced thereby additional liquid must be supplied from another source. The supplying of this additional liquid is always a source of expense and annoyance in the method and it can be avoided partially or wholly by the utilization of cold products as hereinbefore described.

The term "cooling" as employed herein and in the appended claims comprehends the withdrawal of sensible heat and heat of condensation from the gaseous mixture.

Various changes may be made in the details of operation and in the apparatus employed without departing from the invention or sacrificing any of the advantages thereof.

We claim:—

1. The method of liquefying gases, which comprises compressing, cooling and partially expanding the gas, cooling the expanded gas to substantially the liquefaction temperature corresponding to the pressure to which the gas is expanded and finally subjecting the gas to backward return condensation by thermal contact with previously liquefied portions thereof.

2. The method of liquefying gases, which comprises compressing, cooling and partially expanding the gas with external work, cooling the expanded gas to substantially the liquefaction temperature corresponding to the pressure to which the gas is expanded, and finally subjecting the gas to backward return condensation by thermal contact with previously liquefied portions thereof.

3. The method of liquefying gases, which comprises compressing, cooling and partially expanding the gas, cooling the expanded gas by thermal contact with a gaseous refrigerating agent to substantially the liquefaction temperature corresponding to the pressure to which the gas is expanded, and finally subjecting the gas to backward return condensation by thermal contact with previously liquefied portions thereof.

4. The method of liquefying gases, which comprises compressing, cooling and partially expanding the gas, cooling the expanded gas to substantially the liquefaction temperature corresponding to the pressure to which the gas is expanded, and finally subjecting the gas to backward return condensation by thermal contact with previously liquefied portions thereof evaporating at a lower pressure.

5. The method of separating the constituents of gaseous mixtures, which comprises compressing, cooling and partially expanding the gaseous mixture, cooling the gaseous mixture by thermal contact with a product of the separation to a temperature below that attained by expansion, and subjecting the cooled gaseous mixture to thermal contact with previously liquefied portions thereof to produce a liquid containing the constituents and a residual gaseous product.

6. The method of separating the constituents of gaseous mixtures, which comprises compressing, cooling and partially expanding the gaseous mixture, cooling the gaseous mixture by thermal contact with a product of the separation to a temperature below that attained by expansion, subjecting the cooled gaseous mixture to thermal contact with previously liquefied portions thereof to produce a liquid containing the constituents and a residual gaseous product, and rectifying the liquid to effect a further separation.

7. The method of separating the constituents of gaseous mixtures, which comprises compressing, cooling and partially expanding the gaseous mixture with external work, cooling the gaseous mixture by thermal contact with a product of the separation to a temperature below that attained by expansion, and subjecting the cooled gaseous mixture to thermal contant with previously liquefied portions thereof to produce a liquid containing the constituents and a residual gaseous product.

8. The method of separating the constituents of gaseous mixtures, which comprises compressing, cooling and partially expanding the gaseous mixture, cooling the gaseous mixture by thermal contact with a liquid product of the separation to a temperature below that attained by expansion, and subjecting the cooled gaseous mixture to thermal contact with previously liquefied portions thereof to produce a liquid containing the constituents and a residual gaseous product.

9. The method of separating the constituents of gaseous mixtures, which comprises compressing, cooling and partially expanding the gaseous mixture, cooling the gaseous mixture by thermal contact with a product of the separation to a temperature below that attained by expansion, and subjecting the cooled gaseous mixture to thermal contact with previously liquefied portions thereof evaporating at a lower pressure to produce a liquid containing the constituents and a residual gaseous product.

10. The method of separating the constituents of gaseous mixtures, which comprises compressing, cooling and partially expanding the gaseous mixture with external work, cooling the gaseous mixture by thermal contact with a product of the separation to a temperature below that attained by expansion, subjecting the cooled gaseous mixture to thermal contact with previously liquefied portions thereof to produce a liquid containing the constituents and a residual gaseous product, and rectifying the liquid to effect a further separation.

11. The method of separating the constituents of gaseous mixtures, which comprises compressing, cooling and partially expanding the gaseous mixture, cooling the gaseous mixture by thermal contact with a liquid product of the separation to a temperature below that attained by expansion, subjecting the cooled gaseous mixture to thermal contact with previously liquefied portions thereof to produce a liquid containing the constituents and a residual gaseous product, and rectifying the liquid to effect a further separation.

12. The method of separating the constituents of gaseous mixtures, which comprises compressing, cooling and partially expanding the gaseous mixture, cooling the gaseous mixture by thermal contact with a product of the separation to a temperature below that attained by expansion, subjecting the cooled gaseous mixture to thermal contact with previously liquefied portions thereof evaporating at a lower pressure to produce a liquid containing the constituents and a residual gaseous product, and rectifying the liquid to effect a further separation.

13. The method of separating the constituents of gaseous mixtures, which comprises compressing, cooling and partially expanding a portion of the gaseous mixture, cooling the gaseous mixture by thermal contact with a product of the separation to a temperature below that attained by expansion, subjecting the cooled gaseous mixture to thermal contact with previously liquefied portions thereof to produce a liquid containing the constituents and a residual gaseous product, rectifying this liquid and the vapors therefrom, liquefying the other portion of the gaseous mixture at its initial pressure by thermal contact with products of the separation and rectifying this liquid with vapors from the liquid produced from the expanded portion.

14. The method of separating the constituents of gaseous mixtures, which comprises compressing, cooling and partially expanding a portion of the gaseous mixture, cooling the gaseous mixture by thermal contact with a product of the separation to a temperature below that attained by expansion, subjecting the cooled gaseous mixture to thermal contact with previously liquefied portions thereof to produce a liquid containing the constituents and a residual gaseous product, rectifying this liquid and the vapors therefrom, liquefying the other portion of the gaseous mixture at its initial pressure by thermal contact with products of the separation, rectifying this liquid with vapors from the liquid produced from the expanded portion, liquefying a gas consisting principally of the most volatile constituent of the mixture and rectifying the vapors from the two preceding liquids with this liquid.

15. The method of separating the constituents of gaseous mixtures, which comprises compressing, cooling and partially expanding the gaseous mixture, cooling the gaseous mixture by thermal contact with a gaseous product of the separation, expanding the gaseous product, again cooling the expanded gaseous mixture by thermal contact with the expanded gaseous product, and subjecting the cooled gaseous mixture to thermal contact with previously liquefied portions thereof to produce a liquid containing the constituents and a residual gaseous product.

16. The method of separating the constituents of gaseous mixtures, which comprises compressing, cooling and partially expanding the gaseous mixture, cooling the gaseous mixture by thermal contact with a gaseous product of the separation, expanding the gaseous product, again cooling the expanded gaseous mixture by thermal contact with the expanded gaseous product, subjecting the cooled gaseous mixture to thermal contact with previously liquefied portions thereof to produce a liquid containing the constituents and a residual gaseous product and rectifying the liquid to effect further separation.

17. The apparatus for liquefying gases, which comprises means for compressing, cooling and expanding the gas, means for cooling the expanded gas to a temperature lower than that attained by the expansion, means for subjecting the cooled expanded gas to backward return condensation by thermal contact with previously liquefied portions thereof and means for withdrawing a residual unliquefied portion of the cooled expanded gas.

18. The apparatus for liquefying gases, which comprises means for compressing, cooling and expanding the gas with external work, means for cooling the expanded gas to a temperature lower than that attained by the expansion, means for subjecting the cooled expanded gas to backward return condensation by thermal contact with previously liquefied portions thereof and means for withdrawing a residual unliquefied portion of the cooled expanded gas.

19. The apparatus for liquefying gases, which comprises means for compressing, cooling and expanding the gas, means for cooling the expanded gas to a temperature lower than that attained by the expansion by thermal contact with a gaseous refrigerating agent, means for subjecting the cooled expanded gas to backward return condensation by thermal contact with previously liquefied portions thereof and means for withdrawing a residual unliquefied portion of the cooled expanded gas.

20. The apparatus for separating the constituents of gaseous mixtures, which comprises means for compressing, cooling and expanding the gaseous mixture, means for cooling the expanded gaseous mixture to a temperature lower than that attained by the expansion, means for subjecting the cooled expanded gas to backward return condensation by thermal contact with previously liquefied portions thereof to produce a liquid containing the constituents and a residual gaseous product and means for rectifying the liquid.

21. The apparatus for separating the constituents of gaseous mixtures, which comprises means for compressing, cooling and expanding the gaseous mixture, means for cooling the expanded gaseous mixture to a temperature lower than that attained by the expansion by thermal contact with a gaseous product of the separation, means for expanding the gaseous product, means for again cooling the expanded gaseous mixture by thermal contact with the expanded gaseous product, means for subjecting the cooled expanded gas to thermal contact with previously liquefied portions thereof to produce a liquid containing the constituents and a residual gaseous product and means for rectifying the liquid.

In testimony whereof we affix our signatures.

CLAUDE C. VAN NUYS.
JOSEPH L. SCHLITT.